(12) United States Patent
Gilman (10) Patent No.: US 6,179,117 B1
(45) Date of Patent: Jan. 30, 2001

(54) VIBRATORY CONVEYOR

(75) Inventor: David E. Gilman, Washougal, WA (US)

(73) Assignee: Allen Machinery, Inc., Portland, OR (US)

( * ) Notice: Under 35 U.S.C. 154(b), the term of this patent shall be extended for 0 days.

(21) Appl. No.: 09/519,680

(22) Filed: Mar. 6, 2000

Related U.S. Application Data

(63) Continuation of application No. 09/003,998, filed on Jan. 8, 1998.

(51) Int. Cl.$^7$ .................................................. B65G 27/24
(52) U.S. Cl. .......................... 198/751; 198/761; 198/769; 198/763
(58) Field of Search .................................... 198/769, 761, 198/763, 751

(56) References Cited

U.S. PATENT DOCUMENTS

| | | | |
|---|---|---|---|
| 3,032,175 | * 5/1962 | Thomas | 198/763 |
| 4,216,416 | * 8/1980 | Grace | 198/751 |
| 4,313,535 | * 2/1982 | Carmichael | 198/763 |
| 4,378,064 | * 3/1983 | Brown | 198/769 |
| 5,054,606 | * 10/1991 | Musschoot | 198/751 |
| 5,868,241 | * 2/1999 | Pellegrino | 198/763 |

FOREIGN PATENT DOCUMENTS

WO 86/02058 * 4/1986 (WO) ................................. 198/751

* cited by examiner

Primary Examiner—Christopher P. Ellis
Assistant Examiner—Mark A. Deuble
(74) Attorney, Agent, or Firm—Chernoff, Vilhauer, McClung, & Stenzel, LLP (57) ABSTRACT

A conveying system with a frame supporting a conveying member suitable to move products thereon. A drive, which is preferably an electromagnetic drive having a mass that vibrates back and forth along a substantially straight path, is connected to the frame.

4 Claims, 6 Drawing Sheets

FIG. 10

VIBRATORY CONVEYOR

This is a continuation of application Ser. No. 09/003,998 filed Jan. 8, 1998.

BACKGROUND OF THE INVENTION

The present invention relates to an excited frame vibratory conveying apparatus for conveying objects thereon.

Carmichael, U.S. Pat. No. 4,313,535, incorporated by reference herein, discloses an excited frame vibratory conveyor that includes an elongated conveying member mounted by beam springs on an excited frame. The excited frame has a balanced vibratory drive for vibrating the excited frame along a line of force that passes through the center of masses of the conveying member and the excited frame. The balanced vibratory drive includes a pair of counter-rotating masses that provide a resultant vibratory force. The basic objective of such a system is to maintain the vibration amplitude of the excited frame at zero while the conveying bed or member is vibrated near its natural frequency of maximum amplitude. The generally recognized advantages of such a system, over conventional direct vibratory conveyors where the vibratory drive is connected directly to the conveying member, is that under some conditions it is possible to transfer less vibration into the floor or ceiling supports and to provide a conveyor that is considerably less massive than the direct drive systems. Carmichael also teaches that the stroke of the conveying member may be controlled by changing the rpm of the vibratory drive. Consequently, it is possible to adjust the stroke of the conveying member by changing the speed of rotation of the vibratory drive.

Unfortunately, the conveyor system taught by Carmichael experiences significant transient vibrational motion of the excited frame and conveying member during start up and shut down of the conveyor system. It is during these periods of transition that significant vibrational forces are transferred into the floor or ceiling supports which may result in catastrophic failure, such as the conveyor system becoming dislodged from its supports. During normal operation product is added to one end of the conveying member at the same rate as it is being discharged from the other end of the conveying member. However, it has been observed that when excess product is added to the conveyor system taught by Carmichael, the system will experience catastrophic failure, such as transferring significant vibrational forces into the floor or ceiling supports, bouncing the excited frame on its supports, and failure of the conveyor system to convey products. In order to prevent such a potentially catastrophic failure, the conveyor system is normally designed to operate at a point less than its maximum efficiency in the event that excess product is added to the conveying member. Carmichael also teaches the use of such an operating point by including only one-third of the weight of the anticipated particulate material in the calculations to determine the loaded center of mass of the elongated conveying member. Unfortunately, operating the conveyor system at such an operating point is less efficient than operating the conveyor system at its resonant frequency.

Frolich et al., U.S. Pat. No. 5,127,512, disclose an electromagnetically driven vibrating conveyor system that operates with a constant excitation frequency. The conveyor system is a dual-mass system, namely, the mass of an electromagnetic drive and the mass of the conveyor itself to which the drive is directly connected thereto. The electromagnetic drive regulates the amplitude of the vibration during operation at different loading conditions. Unfortunately, such a dual-mass system transfers substantial vibrational forces into the floor or ceiling supports and tends to be more massive in comparison to the excited frame system taught by Carmichael. Further, the electromagnetic drive is typically more expensive and complicated than the traditional counter-rotating mass drive, as taught by Carmichael. Bertrand, U.S. Pat. No. 4,088,223, and Fishman et al., U.S. Pat. No. 5,213,200, also disclose direct drive vibratory conveyors.

What is desired, therefore, is an excited frame vibratory conveyor that eliminates the transients occurring during start-up and shutdown, and also operates at maximum efficiency.

SUMMARY OF THE INVENTION

The present invention overcomes the aforementioned limitations of the prior art by providing a conveying system including a frame supporting a conveying member suitable to move products thereon. A drive, which is preferably an electromagnetic drive having a mass that vibrates back and forth along a substantially straight path, is connected to the frame and is operated in a fashion to provide several advantages therefrom.

In a first aspect of the invention, the drive is capable of maintaining the frame substantially stationary while the conveying member is at least one of brought from a stationary state to a generally resonant state suitable to move the products thereon and brought from the generally resonant state suitable to move the products thereon to the stationary state. As such the excited frame experiences no substantial transient vibrational motions during the start up and shut down of the conveyor system. This prevents significant vibrational forces from being transferred into the floor or ceiling supports thereby preventing catastrophic failure.

In another aspect of the invention, the drive also preferably provides a vibratory force to the frame that never matches the natural frequency of the frame while the conveying member is brought from a stationary state to a generally resonant state suitable to move the products thereon. The drive maintains the frame substantially stationary while the conveying member is moving the products thereon. In this manner the transients of the excited frame are reduced during start up and shut down.

In another aspect of the invention, the electromagnetic drive, which preferably has a mass that vibrates back and forth along a substantially straight path, provides a force to the frame in such a manner that the conveying member moves products thereon while the frame maintains substantially stationary. Also the electromagnetic drive may produce a force in a direction which provides both horizontal displacement and vertical displacement to the conveying member while maintaining the frame substantially stationary with the conveying member moving the products thereon. The use of the electromagnetic drive provides superior flexibility for the operation of the excited frame vibratory conveyor than obtainable with a dual counter rotating mass drive taught by Carmichael.

In another aspect of the invention, the electromagnetic drive provides a force to the frame where the force has a variable frequency and the force has a variable amplitude at each of the frequencies. Also the force may have a frequency and an amplitude that are variable independently of one another. In either case the drive maintains the frame substantially stationary while the conveying member is moving the products thereon. This further provides control over the force so that the operating point of the conveyor system may be adequately controlled, even in a region of operation to the left of the resonant point. This also permits the system to recover from a condition that the operating point and mass of product being conveyed would otherwise result in catastrophic failure.

In another aspect of the invention, the drive maintains the frame substantially stationary while said conveying member is moving the products thereon. A sensor senses the vibratory motion of the conveying member. The drive is connected to the frame to provide a vibrating motion in response to the sensor which maintain a substantially constant stroke distance of the conveying member while at least one of the total mass of the products supported by the conveying member is increasing, the total mass of the products supported by the conveying member is decreasing, and spring constants of springs interconnecting the frame to the conveying member change. Also, the sensor may regulate the drive to change the stroke distance of the conveying member. This controllability permits compensation for variances in the operating conditions of the conveyor system while still maintaining a stable system.

In another aspect of the invention, it is advantageous to place two conveyors as close as possible to objects they are feeding (or being bed by). By placing a conveyor's outfeed end close to the object it is feeding, product spillage is reduced. With the counter rotating mass system it is difficult to place conveyors sufficiently close together. Also, the counter rotating mass conveyors cannot be started and stopped in rapid succession due to the transient frame movement which may result in catastrophic failure. The failure may be the result of the conveyor operating in the transient state for extended time periods. The invention permits conveyors to be placed close together without any adverse frame movement due to no transient states of operation. As such the conveying members may be close together, with each conveying member overlapping the path of the other at least in a vertical direction, which is a daunting task using counter rotating mass drives.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
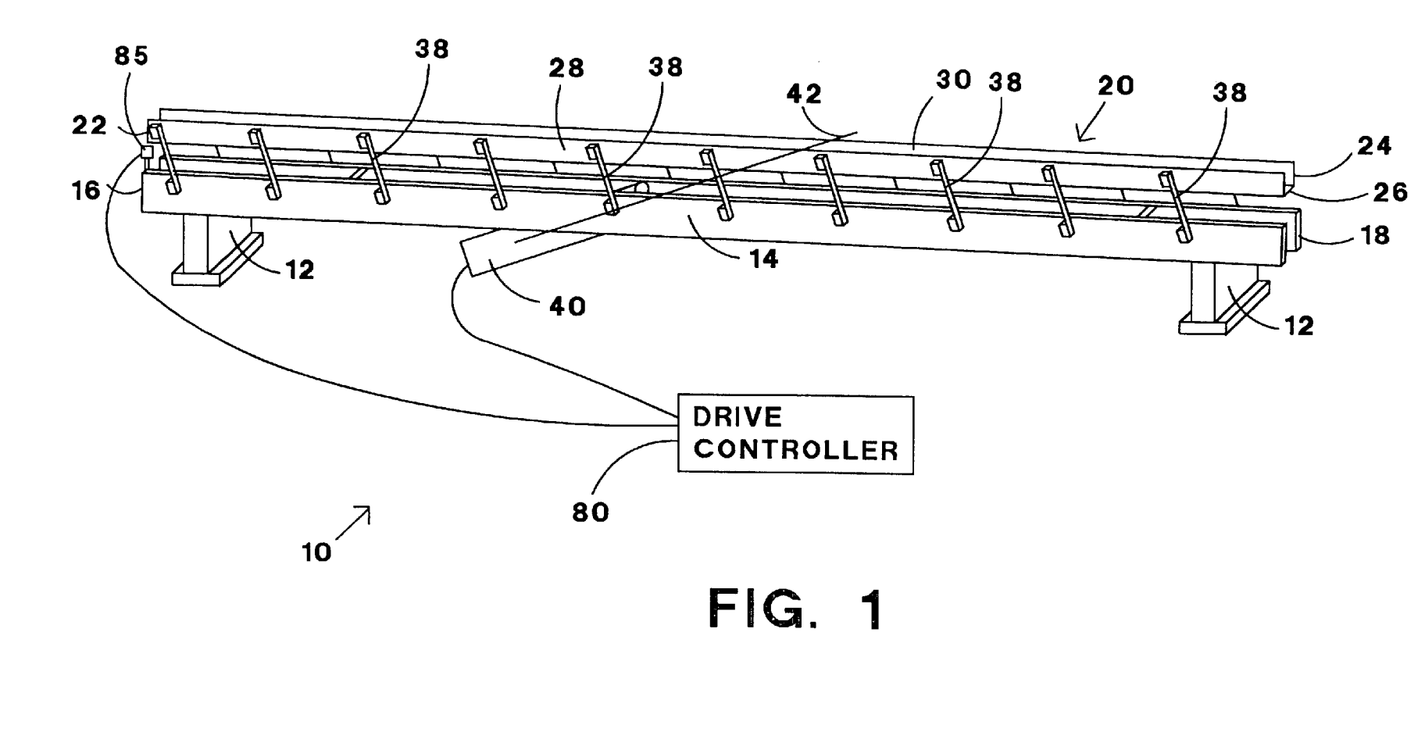
FIG. 1 is a pictorial representation of an exemplary embodiment of a conveyor system with a drive of the present invention.

Referring to FIG. 1, an excited frame vibratory conveying system 10 is supported by a pair of stationary supports 12. The stationary supports 12 include pillars that are attached to the floor and the conveying system 10. Alternatively, the conveying system 10 may be mounted to an upper support, such as a ceiling. The conveying system 10 includes an elongate excited frame 14 generally extending in an intended direction of movement of particulate material from a rear end 16 to a front end 18.

The conveying system 10 includes an elongate conveying member 20 that extends between a rear end 22 and a front end 24. The conveying member 20 includes a conveying bed 26 for receiving the particulate matter or objects. The conveying member 20 includes side walls 28 and 30 that extend between the front end 24 and the rear end 22. The conveying member 20 is preferably a lightweight generally rigid structure.

The conveying system 10 includes a support structure that resiliently supports the conveying member 20 on the excited frame 14. The support structure includes leaf or beam springs 38 that interconnect the conveyor member 20 and the excited frame 14. The springs 38 are spaced apart longitudinally along both sides of the conveying member 20 to enable the conveying member 20 to undergo vibrational motion in a generally forward and rearward reciprocating motion with respect to the excited frame 14. Each of the springs 38 are attached, with bolts or other suitable fasteners, at a slight inclined angle with respect to the longitudinal direction of the conveying system 10. The springs 38 prevent transverse movement of the conveying member 20 with respect to the excited frame 14. The actual path of the reciprocating movement between the conveying member 20 and the excited frame 14 is in the nature of parallelogram, but for small displacements or vibrations along this path, the path may be considered as a straight line which is perpendicular to the face of the springs 38 in their undeflected position. The size and number of the springs 38 are varied to adjust the spring constants.

A vibratory drive 40 is directly connected to the excited frame 14 to vibrate the elongated frame 14 in the intended direction of conveying. Specifically, the vibratory drive 40 is preferably is an electromagnetic drive 40, as opposed to a balanced counter-rotating mass drive as taught by Carmichael. The electromagnetic drive 40 produces a vibratory motion along a linear line of force 42. The electromagnetic drive 40 is described in detail later. The electromagnetic drive 40 is mounted to the elongate frame 14 with its resultant force directed along the linear line of force 42 which is perpendicular to the springs 38. Additionally, the line of force 42 extends though a center of mass 201 of the apparatus, as illustrated schematically in FIG. 2.

The conveying member 20 has a known mass (weight) and a known center of mass 203. For purposes of this invention the center of mass of the conveying member 20 also preferably includes one-half of the weight of the beam springs 38. When the conveying member 20 is loaded with material, the center of gravity of the loaded conveyor is slightly raised or changed to a loaded center of mass 205, as illustrated schematically in FIG. 2.

Figure 2:
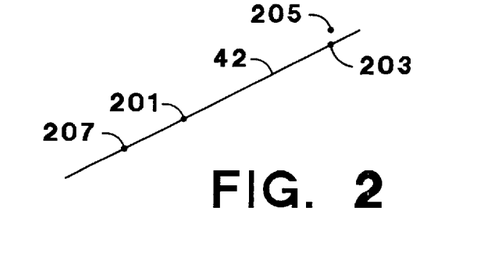
FIG. 2 is a diagram illustrating the line of force of the drive and center of masses of the conveyor system of FIG. 1.

The excited frame 14 has a known mass (weight) and center of mass 207. The center of mass 207 of the excited frame 14 is calculated considering the excited frame 14, the vibratory drive 40, and preferably one-half of the beam springs 38. The calculation of the center of mass for the excited frame 14 does not include the resilient supports. The entire conveying system 10 excluding the resilient supports, has a center of mass 201 that is intermediate and along a line extending through the center of mass 203 of the conveying member 20 and the center of mass 207 of the excited frame 14. Any rocking motion of the conveying member 20 with respect to the excited frame 14 is greatly reduced when the vibratory line of force 42 from the drive 40 extends through the center of mass 201 of the conveying system 10. Consequently, the conveying system 10 is able to operate over a rather large range of loads without any appreciable vibration of the excited frame 14. This reduces the vibration transferred into the lower supports or ceiling supports reducing the likelihood of catastrophic failure. Preferably, the line between the center of masses 203 and 207 is perpendicular to the face of the springs 38 and is coincident with the vibratory line of force 42 extending through the center of mass 204, the center of mass 201, and the center of mass 203.

While it is preferable to orient the vibratory line of force 42 perpendicular to the beam springs 38 and extending though the center of masses 201, 203, and 207, it is very difficult to always attain such alignment of the drive 40, particularly when the product load is unknown. Good results may be achieved if the center of mass 205 of the conveying member 20 is at a distance from the vibration line of force 42 of less than 10 percent of the distance between the center of mass 203 and the center of mass 207.

Figure 3:
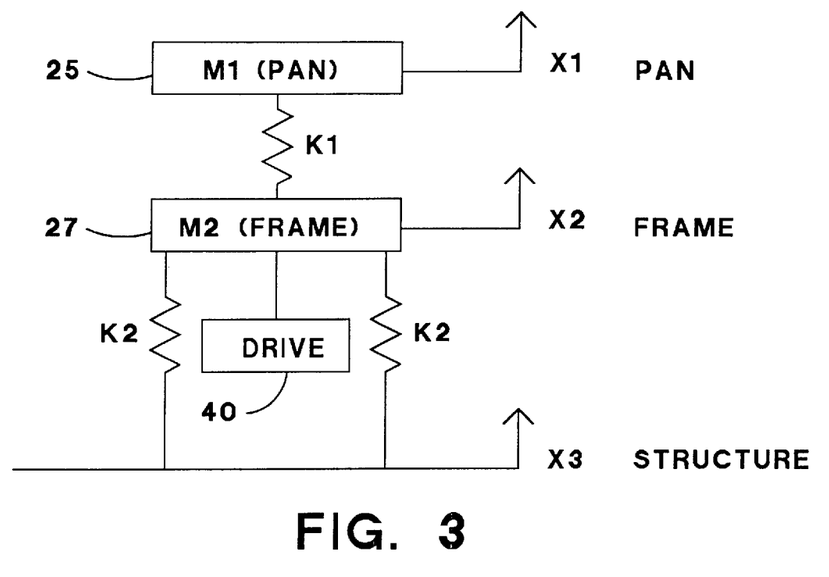
FIG. 3 is a mass and spring diagram illustrating the forces of the conveyor system of FIG. 1.

Referring to FIG. 3, a mass-spring diagram is shown of the conveying system 10. The mass of the conveying member 20 together with a percentage of product contained thereon may be referred to as the pan mass 25. The mass of the excited frame 14 together with the vibratory drive 40 may be referred to as the frame mass 27. The springs 38 and other items can be grouped into either the pan mass 25 or the frame mass 27, as desired. K1 refers to the effective spring constant between the pan mass 25 and the frame mass 27. K2 refers to the effective spring constant between the frame mass 27 and the supports. The goal of such a conveying system 10 is to apply a force to the frame mass 27 with the drive 40, taking into consideration the spring constants and different masses, to achieve a displacement of the pan mass 25 in a vibratory motion, while the summation of forces on the frame mass 27 is zero resulting in a substantially stationary frame mass 27. If the frame mass 27 maintains a stationary position then there will be no resultant fluxuating forces applied to the supporting surface as a result of movement of the conveying system 10.

Figure 4:
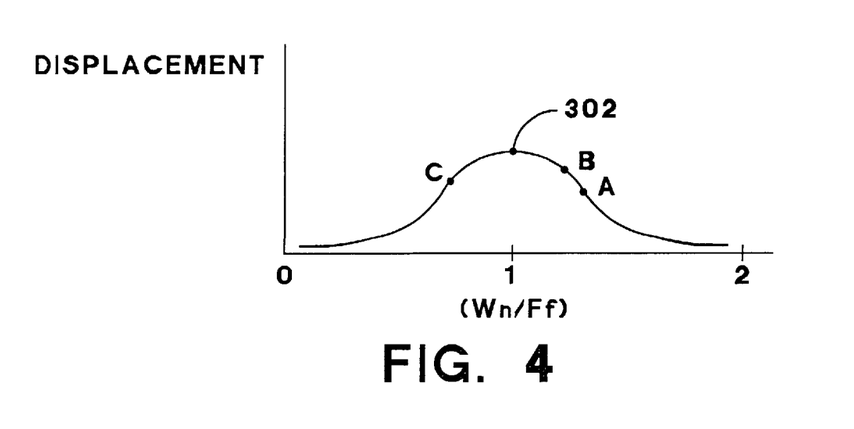
FIG. 4 is a displacement versus frequency graph of the conveyor system of FIG. 1.

Referring to FIG. 4, the displacement of the conveying member depends on the natural frequency of the conveying member $W_n(pan)$ and the forced frequency $F_f(drive)$ from the vibratory drive 40. As $W_n(pan)/F_f(drive)$ becomes closer to unity the total displacement of the conveying member, otherwise referred to as the stroke distance, increases to its maximum which is when the drive is at its greatest efficiency. The aforementioned unity point of operation is typically referred to as point of resonance 302. The $W_n(pan)$ is preferably calculated as: $W_n(pan)$=square root $[K1/M_{total}]$ where $M_{total}$ is calculated as $M_{pan}$+approx 50 percent of the mass of the product. The conveying system 10 is typically designed, with the $F_f(drive)$ selected to be slightly less than $W_n(pan)$ so that the conveying system 10 operates at a stable point to the right of resonance. Such a stable point may be at point A. If the total mass of product on the conveying member 20 increases then the $W_n(pan)$ will decrease. This causes the operating point of the conveying system 10 to move left along the displacement curve, such as point B. This results in more efficient operation of the conveying system 10 as the operating point moves closer to resonance with increased stroke distance.

However, if excess product is added to the conveying member 20 then the $W_n(pan)$ will decrease sufficiently and move the operating point past the resonance mode point 302 to the left side of the curve $[(W_nF_f)<1]$ resulting in a decrease in efficiency. As the efficiency decreases, the stroke distance also decreases. This results in an increase in the total mass of product on the conveying system 10 as the mass of products entering to the conveying system 10 is greater than the mass of products exiting from the conveying system 10 because the feeder for the conveying system 10 normally provides products at a relatively constant rate. The total mass of the conveying member 20, including products thereon, continues to increase which further decreases its natural frequency $W_n(pan)$. This process of increasing mass on the conveying member and decreasing natural frequency continues until catastrophic failure occurs, such as, for example, erratic movement of the excited frame 14, the excited frame 14 bouncing on its supports, and no conveying of product on the conveying member 20. In extreme cases, the excited frame 14 can experience sufficient vibrational forces to result in the conveying system becoming detached from its supports, potentially injuring workers nearby and other equipment in the vicinity of the conveyor system.

The aforementioned potentially catastrophic failure is not easily prevented with the teachings of Carmichael because the Carmichael conveying system includes a pair of balanced counter-rotating masses. The stroke of the conveying member of Carmichael may be controlled by changing the rotational speed of the vibratory drive. While changing the rotational speed of the drive provides a range of possible operational frequencies, the particular force applied by the counter-rotating masses at each particular frequency is fixed for each drive. At a rotational speed much removed from the designed operating point where the rotational speed of the balanced counter-rotating masses provide the desired resultant force, the limitation of one particular force at each particular frequency fails to provide a suitable combination of force (magnitude) and frequency to maintain the excited frame 14 stationary. There are counter-incentive reasons not to even implement a variable frequency counter-rotating mass system. First, the ramping up of the rotational speed of the drive during start up from a stationary state to a fully operating state may be to slow, resulting in substantial damage to the conveyor system, as described later. Second, if the conveyor system experiences a power loss, then many drive controllers will default to a ramp up feature which may result in substantial damage to the conveyor system, as described later. Third, the ramp up power from the drive controller may not be under controlled conditions from a power failure and resulting in improper operation of the conveying system. Fourth, variable frequency controllers are expensive adding unnecessary expensive to the conveying system with limited perceived benefits. All of the aforementioned limitations of a variable frequency counter rotating mass drive can be eliminated by designing a sufficient operational margin to the right of the resonance point 302 for any anticipated mass of product. In addition, it is much simpler to change the pulleys of the Carmichael system to effect a frequency change, which is fail safe under all conditions. Safety and reliability under all operating conditions is a critical factor for the design of conveying systems, and motivates designers against designing conveying systems which may, under even unlikely conditions, result in a possible catastrophic failure.

The present inventor came to the realization that the limitation inherent in counter rotating mass drives which provide a fixed force at each particular frequency does not provide the necessary variability to properly control the operating point of the conveying system 10, for operating points much removed from the designed operating point with the estimated mass of products to be conveyed on the conveying member 20. This limitation is further heighten by a desire to maintain control over the stability of the conveying system 10 when the operating point moves to the left of the resonance point 302 (FIG. 4), in which the Carmichael system becomes unstable resulting in catastrophic failure. The present inventor also came to the realization that if the force (magnitude) and frequency of the drive could be uncoupled then sufficient control of the conveying system 10 may be achieved to overcome the limitations inherent in counter rotating mass drives. The present inventor then came to the realization that the control and versatility may be obtained by replacing the mechanical counter-rotating masses, with a generally more expensive electromagnetic drive 40, as previously mentioned, together with a drive controller 80.

Figure 5:
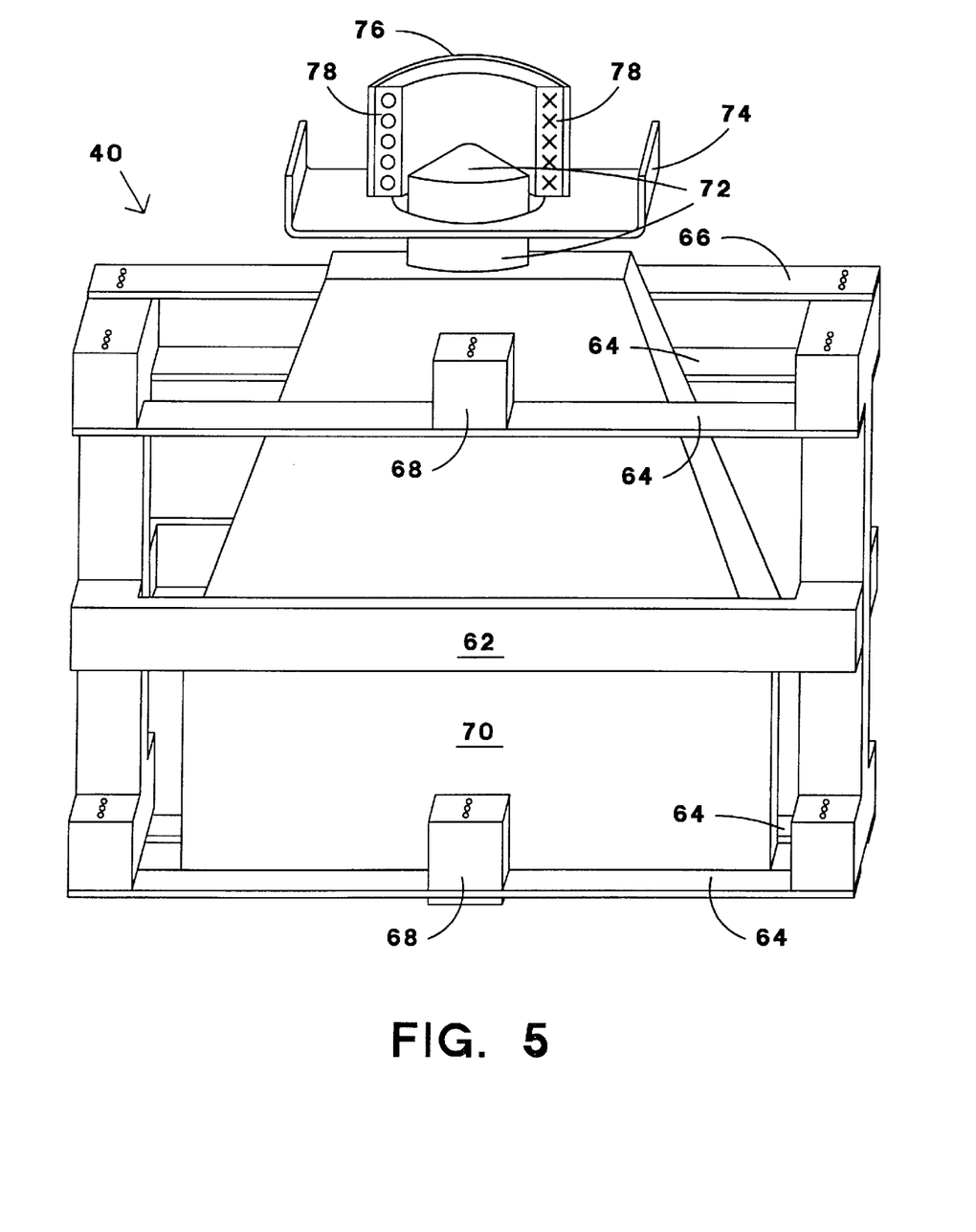
FIG. 5 is a pictorial representation of an exemplary embodiment of the drive of FIG. 1.

Referring to FIG. 5, an electromagnetic drive 40 includes a frame 62 constructed of mild steel. A set of four single fiberglass springs 64 are connected to the frame 62. A single double fiberglass spring 66, including two stacked springs, is also connected to the frame 62. A set of four spring supports 68 (two shown) interconnect a mild steel counterweight 70 and the single springs 64, and the double spring 66. The counterweight 70 may have any suitable mass, such as 220 pounds. Accordingly, the counterweight 70 may be moved in a vibratory fashion along a direction perpendicular to the springs 64 and 66. An armature 72 is attached to the top of the counterweight 70, and may be constructed from any suitable material, such as for example, a mild steel or a permanent magnet. The frame 62 is rigidly attached to the excited frame 14 with the appropriate directional angle so that the resultant force from the movement of the counterweight 70 is directed along line of force 42. A curved plate 74, preferably constructed of stainless steel, supports a housing 76 with an internal set of windings 78 connected to a drive controller 80 (FIG. 2). The curved plate 74 is likewise rigidly attached to the excited frame 14 directly in line with and perpendicular to the armature 72. The diameter of the armature 72 is preferably slightly less than the internal diameter of the windings 78 so that movement of the armature 72 within the housing 76 will not strike the windings 78. Energization of the windings 78 with an electric current creates an electrical field that attracts the armature 72, and hence the counterweight 70 toward the housing 76. This attraction flexes the springs 64 and 66 connected to the frame 62. Upon de-energization of the electric current and hence the electrical field, the springs 64 and 66 pull the counterweight 70 and armature 72 away from the windings 78. By selecting the timing between energization pulses for the electrical field of the windings 78, the frequency of the vibratory motion of the counterweight 70 may be selected. Further, by selecting the magnitude (amplitude) of the energization of the electrical field of the windings 78 by the magnitude of the current, the amplitude of the vibratory motion of the counterweight 70 may likewise be selected independently of its frequency. Reversing the electrical field of energization will push the armature 72, and hence the counterweight 70, away from the windings 78 if the armature 72 is a permanent magnet. This further provides control over both the frequency and amplitude of the force provided by the electromagnetic vibratory drive 40. A typical frequency used for such conveyor systems is 1200 cycles per minute (approximately 20 hertz).

Figure 6:
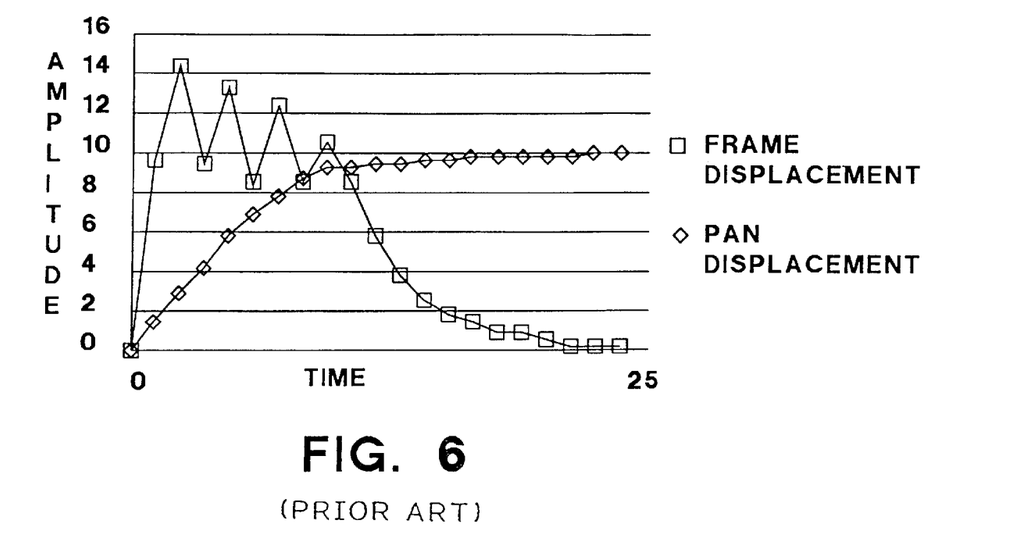
FIG. 6 is a graph of the displacement of the pan and the frame over time for a dual mass counter rotating drive conveyor system.

Another major concern regarding conveying systems, such as the one taught by Carmichael, are transients of the excited frame that occur upon start up and shut down of the conveying system. Referring to FIG. 6, prior to start up both the excited frame and conveying member are stationary. Upon starting of the rotation of the balanced counter-rotating masses, the excited frame undergoes severe transients as the stroke distance of the conveying member is brought to its desired operating frequency, and hence stroke distance. This same transient occurs upon shut down of the conveying system, which may occur in an uncontrolled fashion as a result of power failure.

The present inventor came to the realization that the primary source of such excited frame 14 transients during start up and shut down are a result of the forced frequency from the drive ($F_f$) and the natural frequency of the of the excited frame 14 matching or being close to one another. The natural frequency of the excited frame 14, $W_n$(frame), is generally calculated as the square root of ($K2/(M_{frame} + M_{pan})$). $W_n$(frame) has a frequency generally in the range of ½ hertz to 2 hertz. During start up, when the frequency of the applied force matches, or is substantially the same as the $W_n$(frame), then the drive 40 and excited frame 14 resonate resulting in substantial displacement of the excited frame 14. This occurs upon start up and shut down of the counter-rotating masses when they have a frequency that matches this $W_n$(frame). If the ramp up of the frequency of the counter-rotating masses is to slow, such as may result with a variable frequency controller, then the time during which the forced frequency results in resonance may be extended and result in substantial movement of the excited frame causing catastrophic failure.

Figure 7:
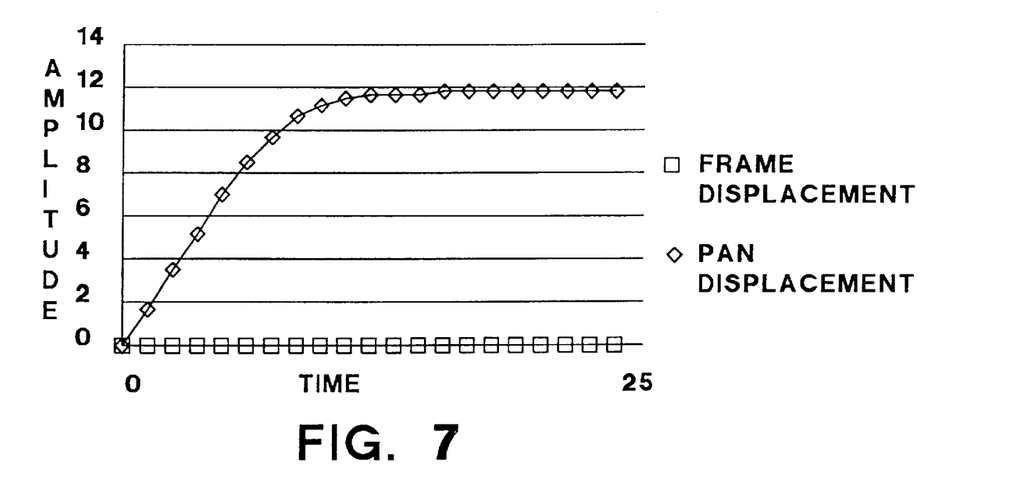
FIG. 7 is a graph of the displacement of the pan and the frame over time for an electromagnetic drive.

In contrast, the electromagnetic vibratory drive 40 does not ramp up in frequency, but rather the proper operating frequency is initially applied to the windings 78 which results in the counterweight 70 also having a vibrational motion with the applied frequency. Accordingly, the counterweight starting frequency is zero then substantially has a frequency with the desired operating frequency nearly immediately. Over a short period of time the amplitude of the counterweight 70 is increased to the desired amplitude. Referring to FIG. 7, while the amplitude is ramped up to the desired operating condition, the frequency does not likewise ramp up but starts at or near the desired frequency so that at no time does the counterweight 70 have a frequency in the general range of ½ to 2 hertz which is applied to the conveyor system 10 (near $W_n$(frame)) that would result in transient motion of the excited frame 14. Likewise, when the conveyor system 10 is shut down the drive 40 stops providing current to the windings 78 so the counterweight 70 simply vibrates near the operational frequency, which is substantially greater than the applied natural frequency of the excited frame, with decreasing amplitude overtime. When the counterweight 70 has an amplitude near zero a slight jitter or movement may be experienced in the excited frame 14 because the counterweight 70 comes to rest and has a frequency matching that of the frame 14, albeit of a far lesser magnitude than those typically observed for counter-rotating masses. As used in the description and as use in the claims, the term "generally resonant state" refers to the operation of the conveyor system at any state of operation other than start-up and shut-down of the system.

An additional feature obtainable with the combination of the drive controller 80 and the electromagnetic drive 40 is the capability of maintaining any suitable operating point on the stroke distance curve. In addition, even operating points on the left side of the resonance point 302 can be maintained by increasing the amplitude to compensate for decreased movement of the product which avoids product buildup on the conveying member 20, and hence catastrophic failure.

A further feature of the drive controller 80 and the drive 40 is its ability to seek out and maintain a maximum stroke distance at resonance mode. The frequency of the controller is initially decreased slowly while the stroke distance of the pan increases. A sensor 85 senses the stroke distance and when the stroke distance starts to decrease the system then knows it has just moved past resonance to the left. Then the controller increases the drive frequency which again increases the stroke distance. When the stroke distance starts to decrease then the system knows it has moved past the resonance point 302 to the right. In this manner, the conveying system 10 can maintain itself at, or near resonance, which reduces power consumption and maximizes the stroke distance. This also reduces the size of the electromagnetic drive 40 necessary to operate the system 10. Further, because of the controllability of the system 20, the system 10 may be designed with an operating point much closer, or at resonance. Also, when additional product is added to the pan, the stroke distance can be maintained at a desirable operating point or distance thereby preventing catastrophic failure which would result without such controllability.

Over time during operation of the conveyor system 10 the spring constants tend to change which changes the operating point of the conveyor system 10. Likewise, the system 10 automatically compensates for such changes and can operate at any desired frequency.

Figure 10:
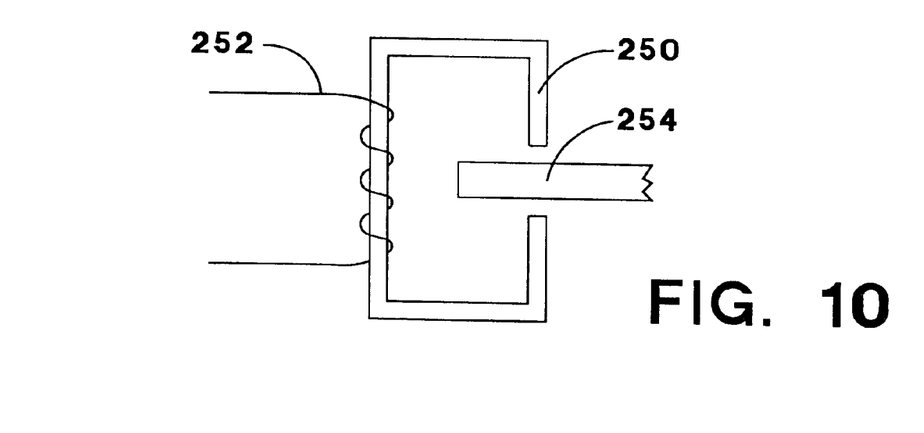
FIG. 10 is an alternative embodiment of the drive of FIG. 1.

Referring to FIG. 10, an alternative embodiment of the electromagnetic drive 40 is a C-shaped magnetically permeable member 250 wound with wire 252 that pulls and/or pushes an armature 254 connected to the counterweight 70. Any other suitable electromagnetic drive may be used.

In addition, if a spring breaks, the system can detect the difference in stroking distance, the same as a change in product mass, and compensate accordingly thus preventing catastrophic failure.

Figure 8:
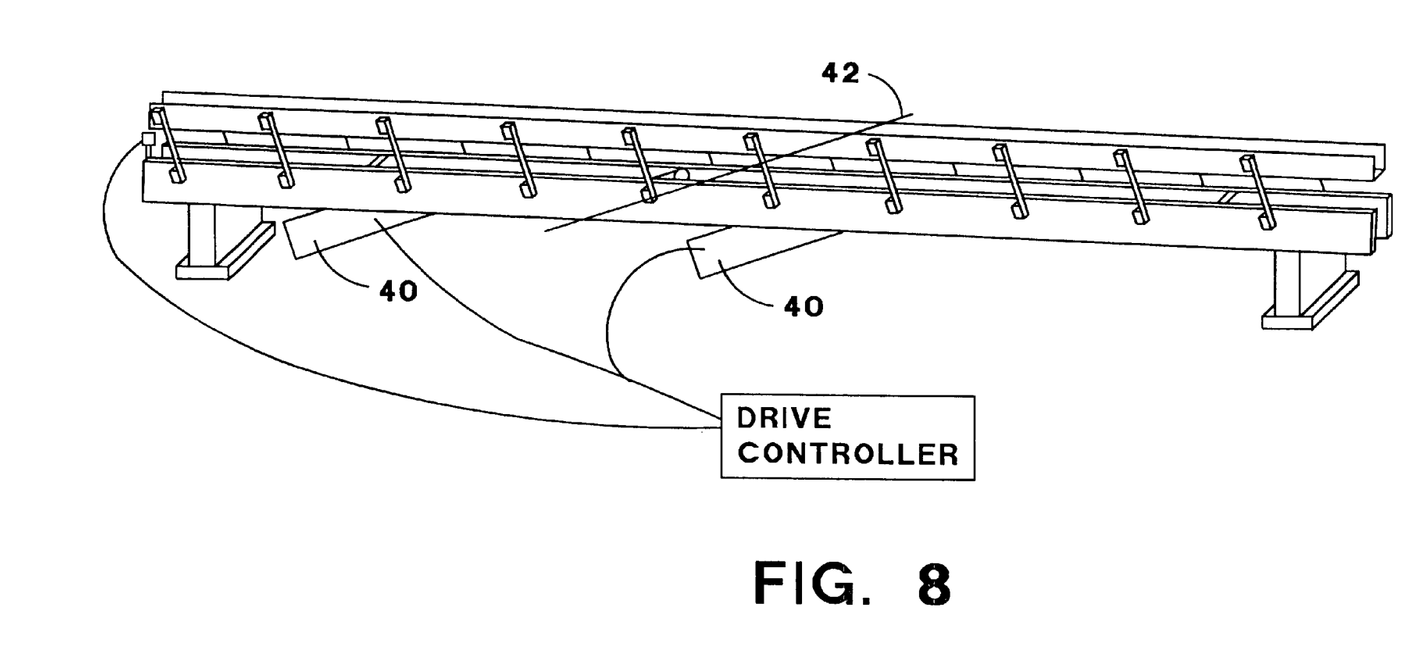
FIG. 8 is a pictorial representation of an exemplary embodiment of a conveyor system of FIG. 1 with two drives.

Referring to FIG. 8, for large or longer conveyor systems where additional force is required than obtainable with a single vibratory drive, a plurality of vibratory drives 40 may be connected to the frame. In such a case the vibratory electromagnetic drives 40 are preferably arranged equal distant on either side and parallel to the line of force 42. The electromagnetic drives may be different distances from the line of force 42 if the forces provided by the respective drives compensate for the different location that the forces are applied to the conveyor system so that the frame remains stationary and the conveyor system does not undergo significant rocking motion. In addition, it may be more cost effective to use more than one electromagnetic drive than a single large electromagnetic drive. The drive controller 80 maintains the drives in phase by varying the magnitude and frequency of the supplied current. It is exceedingly difficult to maintain a plurality of counter rotating mass drives in phase, especially if the frequency of the drive is changed.

Figure 9:
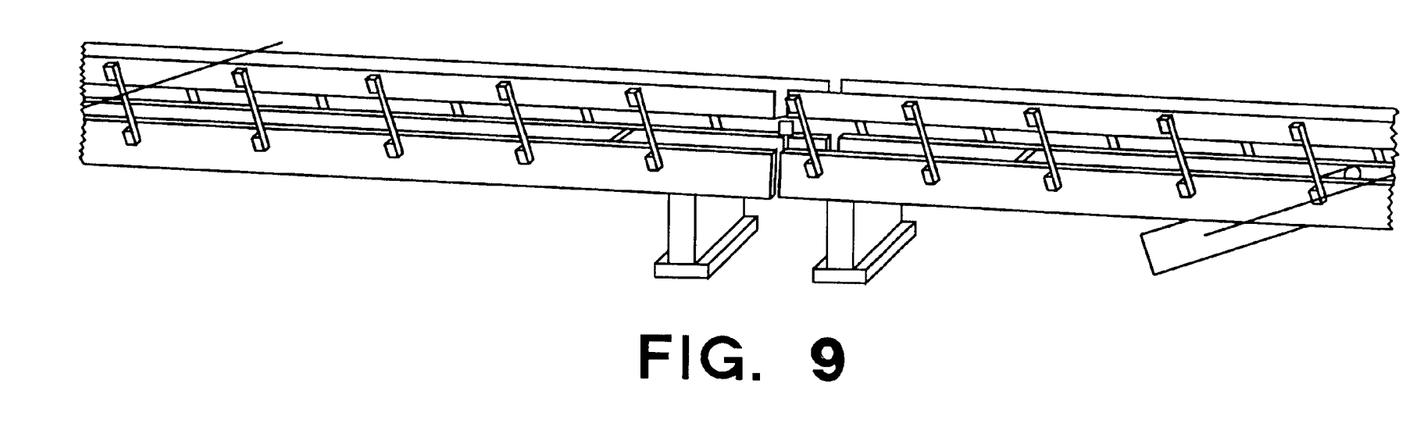
FIG. 9 is a breakaway pictorial representation of an exemplary embodiment of a conveyor system of FIG. 1 with two conveyors.

Referring to FIG. 9, to extend the length of the conveyor system it is more advantageous in many circumstances to employ multiple conveyor systems aligned with one another providing matching vibratory motions. With electromagnetic drives and one or more controllers, as opposed to counter rotating mass drives, it is feasible to maintain the conveyor pans such that they do not result in striking one another. This is especially important because the adjacent conveyor pans are very close to one another.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A conveying system comprising:
   (a) a frame supporting a conveying member suitable to move products thereon;
   (b) a drive maintaining said frame substantially stationary while said conveying member is moving said products thereon;
   (c) a sensor that senses a vibratory motion of said conveying member; and
   (d) said drive connected to said frame to provide a force to said frame in response to said sensor to maintain a substantially constant stroke distance of said conveying member while at least one of the total mass of said products supported by said conveying member is increasing, the total mass of said products supported by said conveying member is decreasing, and spring constants of springs interconnecting said frame to said conveying member change.

2. The conveying system of claim 1 wherein said drive is an electromagnetic drive having a mass that vibrates back and forth along a substantially straight path.

3. A conveying system comprising:
   (a) a frame supporting a conveying member suitable to move products thereon;
   (b) a drive connected to said frame to provide a force to said frame to move said conveying member in a vibrating motion;
   (c) said drive maintaining said frame substantially stationary while said conveying member is moving said products thereon; and
   (d) a sensor that senses said vibrating motion and regulates said drive to change the stroke distance of said conveying member.

4. The conveying system of claim 3 wherein said drive is an electromagnetic drive having a mass that vibrates back and forth along a substantially straight path.

\* \* \* \* \*